Feb. 23, 1965 J. G. MOURRA 3,170,359

MUSIC BOX FOR TELEPHONES

Filed May 10, 1963

INVENTOR

JEAN GEORGE MOURRA

BY Salvatore G. Militana attorney

United States Patent Office 3,170,359
Patented Feb. 23, 1965

3,170,359
MUSIC BOX FOR TELEPHONES
Jean George Mourra, 4922 SW. 87th Place, Miami, Fla.
Filed May 10, 1963, Ser. No. 279,524
2 Claims. (Cl. 84—94)

This invention relates to music boxes but is more particularly directed to a music box attachment for telephones.

A principal object of the present invention is to provide a telephone with a music box attachment which is readily supported on the telephone by the rear portion of the telephone cradle.

Another object of the present invention is to provide a telephone with a music box attachment which is actuated to produce music when the telephone receiver is placed on the attachment and the person on the other end of the telephone line is able to hear the music.

A further object of the present invention is to provide a telephone with an attachment for producing music which is simple in construction, economical in cost and readily attached or removed from a telephone.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figures 1, 2, 3, 4:
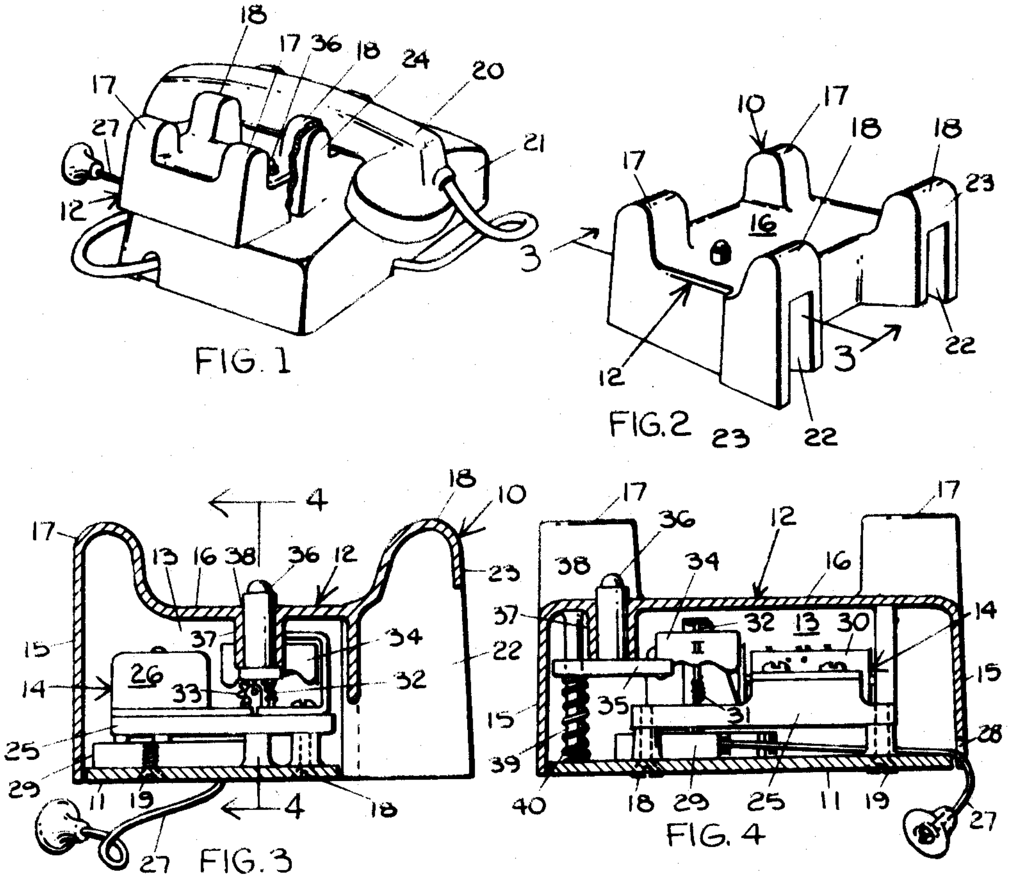
FIGURE 1 is a perspective view of my cradle attachment partially broken away for telephones shown in position on a telephone.
FIGURE 2 is a perspective view of my cradle shown removed from its position on the telephone.
FIGURE 3 is a cross sectional view taken along the line 3—3 of FIGURE 2.
FIGURE 4 is a similar view taken along the line 4—4 of FIGURE 3.

This application is copending with my design application, Serial Number D. 66,594 for A Cradle Attachment For Telephones issued as Design Patent 195,209 on May 14, 1963.

Referring now to the drawing wherein like numerals are used to designate similar parts throughout the several views, the numeral 10 refers to my cradle attachment for telephones comprising a base member 11 and a housing 12 secured thereon by screws 18 to form a chamber 13 in which the music producing mechanism 14 is contained. The housing 12 consists of depending side walls 15 which engage the edges of the base member 11, a top wall 16 and two pairs of shoulder members 17, 18 extending upwardly of the top wall 16 to form a cradle for receiving a telephone receiver 20 when the latter is not resting on its base 21. The telephone receiver 20 rests on the top wall 16 with the shoulder members 17, 17 on one side and the shoulder members 18, 18 on the other side.

The shoulder members 18 are hollow, are positioned forwardly of the housing 12 and provided with a slot 22 on a lower portion of the forward wall 23 to permit access therein. My device 10 is supported on the telephone base 21 by the insertion of the two rear telephone cradle lugs 24 through the slots 22 and permitting the base member 11 to engage and partially rest on the telephone base 21 as shown by FIGURE 1.

Within the chamber 13 the musical producing mechanism 14 is supported on a base 25 fastened to the housing base 11 by screws 19. On the base 25 is the conventional music box and forming no part of the present invention in that these music boxes are available for purchase on the open market. Suffice it to say that when the actuating mechanism is released as will be explained in detail hereinafter, the music box will give forth a tune which is repeated until its spring mechanism is unwound. The spring mechanism contained in the housing 26 is wound by merely pulling on a cord 27 which extends through an opening 28 in the housing 12 to a pulley housing 29 in which a pulley is wound. The pulley in the housing 29 is directly shafted to the spring in the housing 26. By means of a train of gears connecting the spring in the housing 29 to a music drum 30 music is evolved when the spring is released.

Means are provided to selectively release the gearing mechanism or stop same comprising a worm 31 mounted on a vertical shaft 32. The worm 31 is in mesh engagement with a gear 33 as best shown by FIGURE 3, which gear 33 forms a part of the aforementioned gear train. Secured to the shaft so as to rotate therewith is a butterfly or a stop member 34 which rotates when the music box is actuated. In order to permit the shaft 32 and the stop member 34 to rotate, a stop bar 35 must be removed from its normal position. The stop bar 35 is mounted on the base of an actuating pin 36 which is slidably positioned in a sleeve 37 depending from the top wall 16 at an opening 38 in the top wall 16 through which the actuating pin 36 extends. A rod 39 extends from the top wall 16 adjacent to the sleeve 37 for supporting a coil spring 40 which bears on the base member 11 and against a rear portion of the stop bar 35 which is provided with a bore 41 for the rod 39. When the pin 36 is in its normal position extending above the level of the top wall 16 of the housing 12, the spring 40 will be in its extended position and the stop member 35 will engage the stop member 34 to prevent the latter and the music actuating mechanism from operating.

Figure 5:
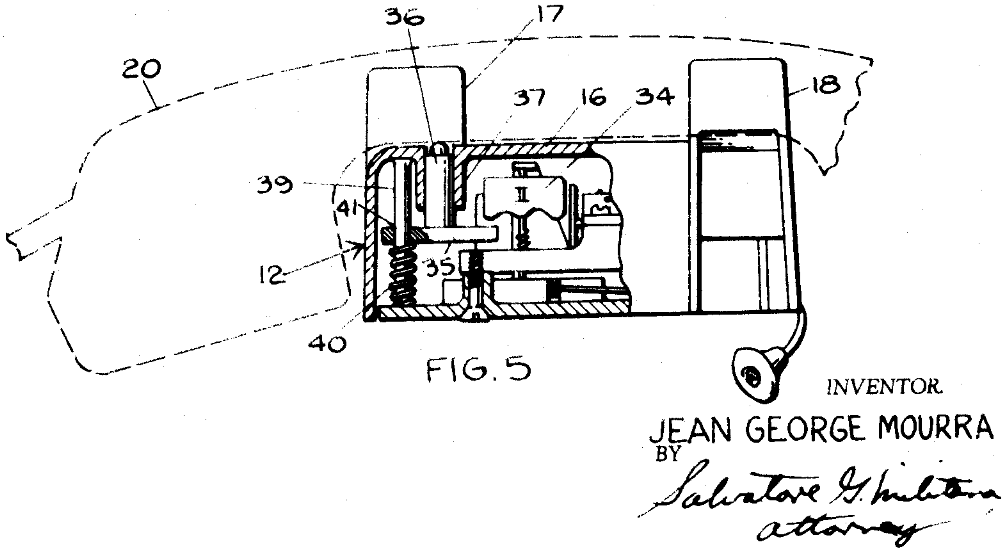
FIGURE 5 is a similar view showing the telephone in dotted lines resting on the cradle attachment.

When it is desired to produce music either the pin 36 is pushed downwardly by one's finger or the telephone receiver 20 which has been removed from its normal position on the telephone base 21 is now placed on the housing cradle between the shoulder 17, 17 and 18, 18. The weight of the telephone receiver 20 will depress the pin 36 against the spring pressure 40 as shown by FIGURE 5. The stop bar 35 is also depressed to a position below the stop member 34 thereby releasing the stop member 34 and permitting the music producing mechanism to function and produce music that may be conveyed through the telephone receiver 20 to the person on the telephone at the other end of the line. When the music is to be terminated as upon the lifting of the telephone receiver 20 from the housing 12, the pin 36 will be released and the spring pressure 40 will force it and the stop bar 35 to slide to the upward position to engage the stop member 34 and stop the music producing mechanism.

What I claim as new and desire to secure by Letters Patent of the United States is:

1. A music box for telephones comprising a housing having a chamber and a plurality of slotted portions at one end releasably mounting said music box on a telephone, a plurality of upstanding shoulder members mounted on said housing forming a cradle receiving the telephone receiver, starting pin means slidably mounted in said cradle engaged by said receiver and extending into said chamber, music producing means mounted in said chamber, actuating means operatively connected to said music producing means mounted in said housing, spring means yieldingly urging said pin means into contact relation with said actuating means preventing the operation of said actuating means whereby upon the depressing of said starting pin means by said telephone receiver said actuating means is released to produce music.

2. A music box attachment for telephones comprising a base member, a housing mounted on said base member forming a chamber, said housing having a top wall, two pairs of aligned shoulder members mounted on said top wall to form a cradle for the telephone receiver, one of said pairs of shoulder members being hollow for removably mounting said attachment to said telephone, a sleeve mounted on said top wall and extending into said chamber, a starting pin slidably mounted in said sleeve, a stop bar mounted on said starting pin in said chamber, a rod mounted in said chamber, said stop bar having a bore receiving said rod for sliding said stop bar on said rod, a coil spring mounted on said rod and yieldingly urging said stop bar and said pin in an upward direction, a rotatable shaft mounted in said chamber in proximity of said stop bar, a stop member secured to said shaft engaged by said stop bar in its upper position, and music producing actuating means operatively connected to said shaft and mounted in said chamber whereby upon the placing of said telephone receiver in said cradle, said starting pin is depressed against said spring pressure and said stop bar is removed from contact relation with said stop member to permit rotational movement of said shaft to permit music to be produced.

References Cited by the Examiner

UNITED STATES PATENTS

| | | | |
|---|---|---|---|
| 56,407 | 7/66 | Gunther | 84—95 |
| 2,106,912 | 2/38 | Herzberg | 179—147 X |
| 2,551,141 | 5/51 | Langis et al. | 179—146 |
| 2,795,161 | 6/57 | Weinman | 84—94 |
| 3,041,911 | 7/62 | Marder | 84—94 |

FOREIGN PATENTS

| | | |
|---|---|---|
| 998,475 | 9/51 | France. |

OTHER REFERENCES

Popular Electronics (periodical), issue of June 1961, pages 71 and 72.

LEO SMILOW, *Primary Examiner.*